United States Patent
Hayashi

(10) Patent No.: US 6,381,312 B1
(45) Date of Patent: Apr. 30, 2002

(54) ACOUSTIC COMMUNICATION TERMINAL APPARATUS AND RECORDING MEDIUM FOR STORING A CONTROL PROGRAM THEREFOR

(75) Inventor: Koichi Hayashi, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/449,556

(22) Filed: Nov. 29, 1999

(30) Foreign Application Priority Data

Dec. 21, 1998 (JP) ......................................... H10-362289

(51) Int. Cl.[7] ............................................. H04M 11/00
(52) U.S. Cl. ................................ 379/93.37; 379/388.4; 379/388.06; 379/388.07
(58) Field of Search ............................. 379/444, 93.37, 379/387, 388.04, 388.06, 388.07

(56) References Cited

U.S. PATENT DOCUMENTS 5,537,220 A * 7/1996 Ezumi ........................ 379/93
6,148,077 A * 11/2000 Fullam ...................... 379/444
6,321,095 B1 * 11/2001 Gavette ...................... 455/517

FOREIGN PATENT DOCUMENTS

JP    A4-83455    3/1992

* cited by examiner

*Primary Examiner*—Ahmad F. Matar
*Assistant Examiner*—Rasha Al-Aubaidi

(57) ABSTRACT

An acoustic communication terminal apparatus for performing data communication over a telephone line by using an acoustic coupler has an error number counter for counting the number of errors occurring during communication. With a control signal based on the result of this counting performed by the error number counter, the gain of an amplifier circuit provided in an acoustic output section of a transmitter portion of the apparatus is switched, and also the gain of an amplifier circuit provided in an acoustic input section of a receiver portion of the apparatus is switched. Alternatively, with the above control signal, the frequency filtering characteristics of an input filter circuit provided in the acoustic input circuit is switched.

12 Claims, 4 Drawing Sheets

ACOUSTIC COMMUNICATION TERMINAL APPARATUS AND RECORDING MEDIUM FOR STORING A CONTROL PROGRAM THEREFOR

BACKGROUND OF THE INVENTION

1. Field of the Invention

The present invention relates to an acoustic communication terminal apparatus for communicating with a communication partner over a telephone line by the use of an acoustic coupler, and relates also to a recording medium for storing a control program for such an acoustic communication terminal apparatus.

2. Description of the Prior Art

Conventionally, an acoustic communication terminal apparatus outputs a signal to be transmitted to a partner in the form of an acoustic signal. This acoustic signal is converted into an electric signal by an acoustic coupler, and is then transmitted to the partner over a telephone line. On the other hand, a signal received from the partner over the telephone line is converted into an electric signal by the acoustic coupler, and is then subjected to various kinds of signal processing.

Here, the acoustic communication terminal apparatus has an acoustic output circuit and an acoustic input circuit. As shown in FIG. 9A, in the acoustic output circuit, a signal 30 to be transmitted to a partner is modulated by a modulation circuit 31, is then amplified by an amplifier circuit 32, and is then output from a loudspeaker 33 as an acoustic signal. The acoustic signal thus output from the loudspeaker 33 is then converted into an electric signal by a microphone of an acoustic coupler, and is then transmitted to a partner over a telephone line.

On the other hand, as shown in FIG. 4B, in the acoustic input circuit, an electric signal received from the partner over the telephone line is converted into an electric signal by a microphone 34 of the acoustic coupler, is then subjected to noise elimination performed by an input filter circuit 35, is then amplified by an amplifier circuit 36, and is then demodulated by a demodulation circuit 37 into the signal in its original form.

Here, the gains of the above-mentioned amplifier circuits 32 and 36 and the filter characteristics of the above-mentioned filter 35 are usually either fixed or manually adjustable. This often makes it difficult to avoid communication errors associated with environmental conditions and the condition of the telephone line. Moreover, it is troublesome to adjust the gains and the filter characteristics manually as required.

To overcome these inconveniences, for example, Japanese Laid-Open Patent Application No. H4-83455 discloses an apparatus provided with a detecting means for detecting a transmission error on the basis of a signal received from a partner apparatus and an adjusting means for adjusting the output sound pressure level of a signal to be output on the basis of error-related data detected by the detecting means. Thus, this apparatus can establish communication by adjusting the output sound pressure level in accordance with the signal received from the partner apparatus.

However, this apparatus works on the assumption that it can receive a signal from a partner apparatus correctly, and therefore it cannot establish communication if it cannot receive a signal from a partner apparatus correctly. Moreover, whereas the output sound pressure level is adjustable, the operation performed to achieve reception remain the same throughout. This sometimes makes it impossible to continue communication when some change occurs in the signal being received due to a change in environmental conditions.

SUMMARY OF THE INVENTION

An object of the present invention is to provide an acoustic communication terminal apparatus that allows easy establishment and reliable continuation of communication, and to provide a recording medium for storing a control program for such an acoustic communication terminal apparatus.

To achieve the above object, according to one aspect of the present invention, an acoustic communication terminal apparatus is provided with: a transmitter for transmitting an acoustic signal; a receiver for receiving an acoustic signal; an error number counter for counting the number of errors occurring during communication; and a communication quality controller for improving the quality of communication by controlling the operation of the transmitter and the receiver according to the number of errors counted by the error number counter.

This acoustic communication terminal apparatus automatically counts the number of errors occurring during communication and controls the operation of both the transmitter and the receiver according to the number of errors thus counted. Accordingly, it is possible to remove the cause of an error irrespective of whether it is due to a fault in transmission or reception, and thus it is possible to establish and continue communication reliably. Moreover, it is possible to secure high quality of communication even when a change occurs in environmental conditions.

Here, what is controlled in practice is, for example, the amplifying operation performed by the transmitter and the receiver, or the filtering operation performed by the receiver.

According to another aspect of the present invention, a recording medium has a program stored thereon that is to be run on an acoustic communication terminal apparatus that achieves communication by acoustic coupling, and the program includes: a transmission step of transmitting an acoustic signal; a reception step of receiving an acoustic signal; and a step of improving the quality of communication by counting the number of errors occurring during communication and by varying the operation performed in the above-mentioned transmission and reception steps according to the number of errors counted.

By designing an acoustic communication terminal apparatus to operate according to the program stored on this medium, it is possible to establish and continue communication reliably, and to secure high quality of communication even when a change occurs in environmental conditions.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1A:
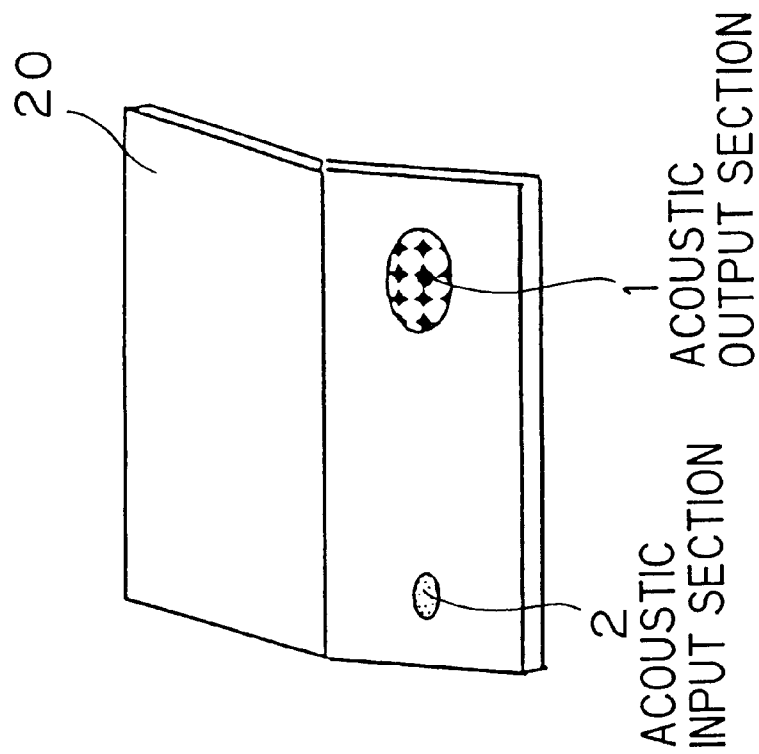
FIGS. 1A and 1B are perspective views showing the appearance of a portable data terminal, as an example of an acoustic communication terminal apparatus embodying the invention.
Figure 1B:
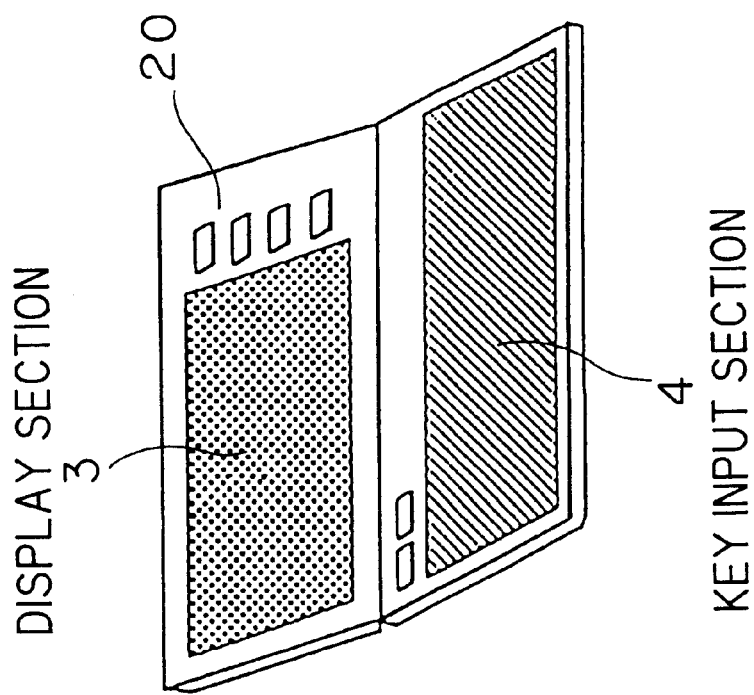

Hereinafter, an embodiment of the present invention, wherein the present invention is applied to a portable data terminal that achieves data communication by acoustic coupling, will be described with reference to the accompanying drawings. FIGS. 1A and 1B are diagrams showing the appearance of the portable data terminal of this embodiment, FIG. 2 is a block diagram showing the configuration of its internal circuit, and FIG. 3 is a flow chart showing the flow of its operations.

As shown in FIGS. 1A and 1B, the portable data terminal of this embodiment has an acoustic output section 1 and an acoustic input section 2 provided on a surface of a body 20. The acoustic output section 1 and the acoustic input section 2 are so arranged as to be readily coupled acoustically with a handset of a telephone set. The body 20 has also a display section 3 and a key input section 4 provided thereon. The portable data terminal is run by electronic circuits, batteries, and others that are housed inside the body 20, underneath the above-mentioned acoustic output section 1, acoustic input section 2, display section 3, and key input section 4.

Figure 2:
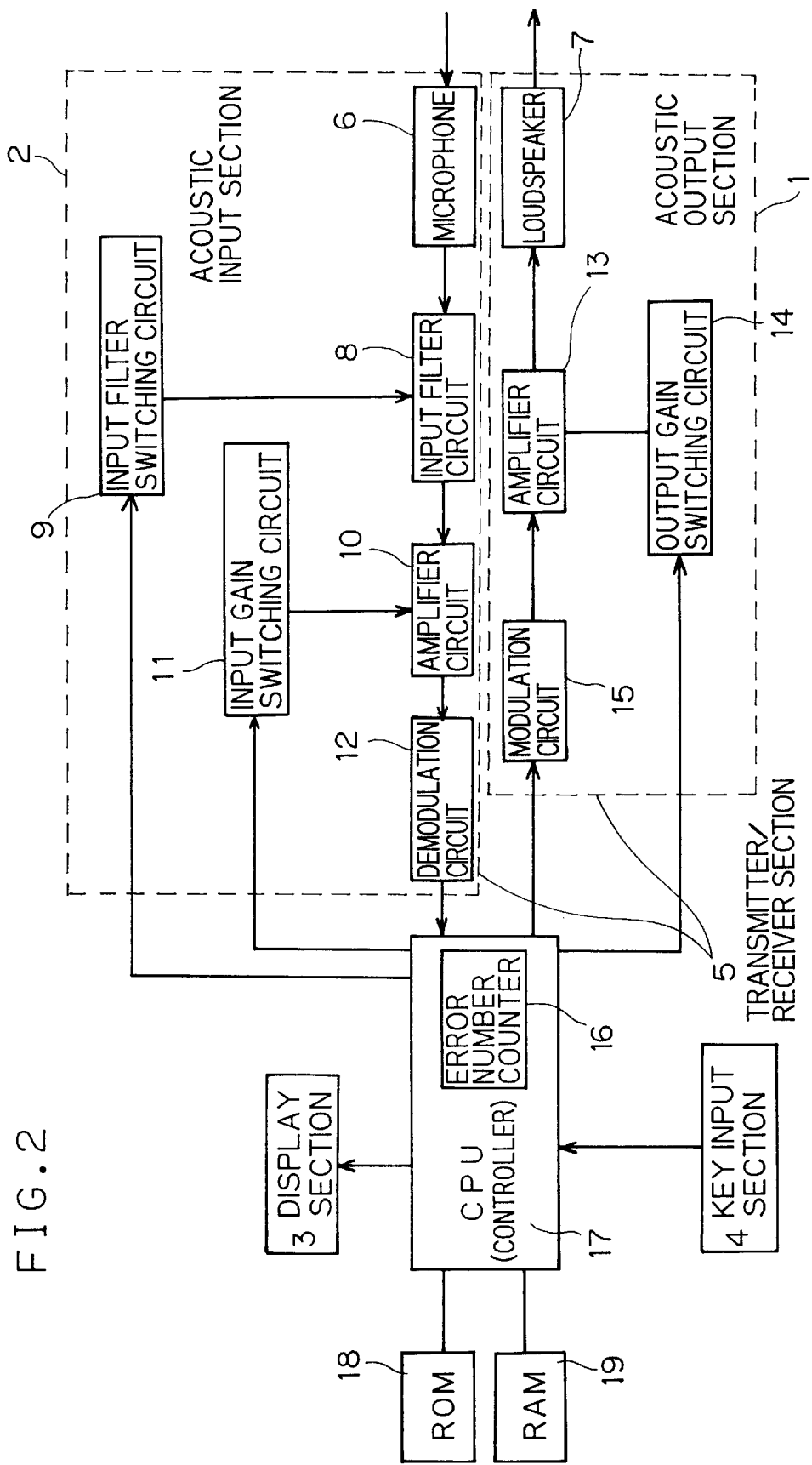
FIG. 2 is a block diagram showing the configuration of the internal circuit of the portable data terminal shown in FIGS. 1A and 1B.
Figure 3:
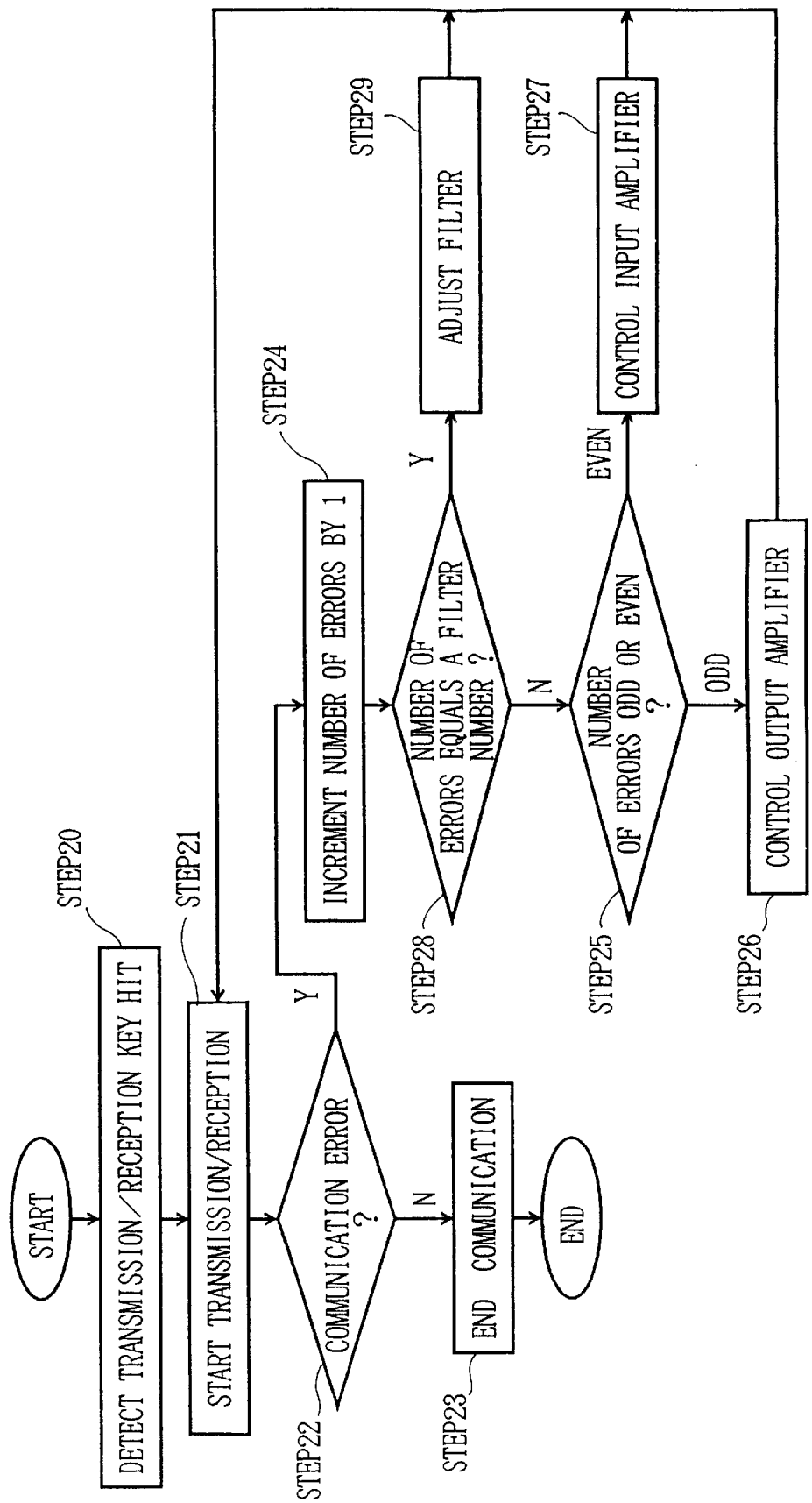
FIG. 3 is a flow chart showing the flow of operations performed by the portable data terminal shown in FIGS. 1A and 1B.
Figure 4A:
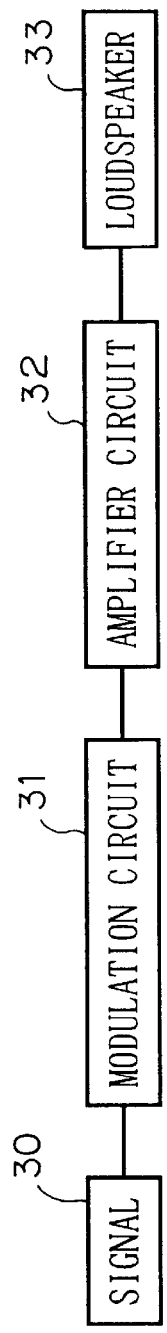
FIGS. 4A and 4B are block diagrams showing the configuration of a conventional acoustic communication terminal apparatus.
Figure 4B:
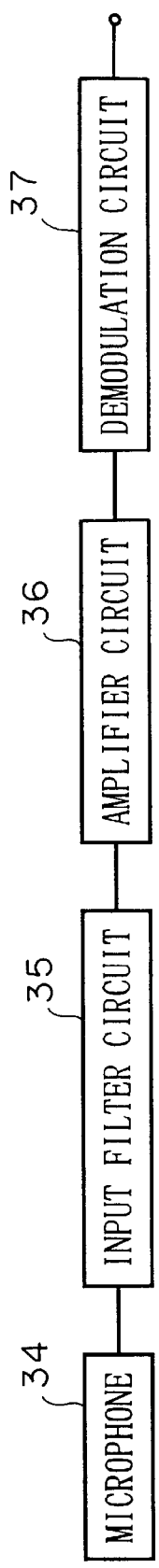

FIG. 2 is a block diagram showing the configuration of the electronic circuit housed inside this portable data terminal. In FIG. 2, reference numeral 17 represents a CPU that performs control in general of what is performed inside the body 20 so as to achieve, for example, display of input data, data transmission and reception, data processing, and storage. Reference numeral 18 represents a ROM having a program stored therein according to which the CPU 17 runs. Reference numeral 19 represents a RAM that is used to store data entered by the user and data received or to be transmitted and that is used as work memory by the CPU 17. The CPU 17 incorporates an error number counter 16 that counts the number of errors occurring during communication achieved by acoustic coupling.

In FIG. 2, the two portions surrounded with broken lines, i.e. the acoustic output section 1 and the acoustic input section 2, together constitute a transmitter/receiver section, indicated by reference numeral 5, of the portable data terminal of this embodiment. The acoustic output section 1 is composed of a modulation circuit 15 for modulating data to be transmitted, an amplifier circuit 13 for driving a loudspeaker 7, and an output gain switching circuit 14 for switching the gain of the amplifier circuit 13. The CPU 17 outputs data to be transmitted, which is then modulated by the modulation circuit 15, is then amplified by the amplifier circuit 13 so as to drive the loudspeaker 7, and is thus output from the loudspeaker 7 as an acoustic signal to be transmitted. This acoustic signal is then transmitted through a microphone of an acoustic coupler (not shown) and then over a telephone line to a data terminal apparatus or the like of a communication partner.

If a communication error occurs in the communication being performed with the data terminal apparatus or the like of the partner while the acoustic signal to be transmitted is being output from the loudspeaker 7 of the acoustic output section 1, the error number counter 16 incorporated in the CPU 17 counts the error, and, in accordance with the number of errors counted, the output gain switching circuit 14 increases the gain of the amplifier circuit 13. In this way, it is possible to increase stepwise the output sound pressure level of the acoustic signal output from the loudspeaker 7 for transmission, and thereby reduce communication errors.

On the other hand, the acoustic input section 2 is composed of a microphone 6 for receiving a received acoustic signal obtained by converting a signal received from the data terminal apparatus (not shown) of the partner into sounds through the acoustic coupler (not shown), an input filter circuit 8 for eliminating noise from the received signal output from the microphone 6, an amplifier circuit 10 for amplifying the received signal fed from the input filter circuit 8, a demodulation circuit 12 for demodulating the amplified received signal into received data, an input gain switching circuit 11, and an input filter switching circuit 9.

Accordingly, the acoustic signal originating from the data terminal apparatus of the partner and fed to the acoustic coupler is received by the microphone 6, is then subjected to noise elimination performed by the input filter circuit 8, is then amplified by the amplifier circuit 10, is then demodulated by the demodulation circuit 12, and is then fed, as received data, to the CPU 17.

If a communication error occurs while the signal transmitted from the data terminal apparatus of the partner is being received, the error number counter 16 incorporated in the CPU 17 counts the error, and, in accordance with the number of errors counted, the input gain switching circuit 11 is controlled to vary stepwise the input signal gain, or the input filter switching circuit 9 is controlled to switch the frequency filtering characteristics of the input filter circuit 8. Specifically, if the number of errors counted by the error number counter 16 increases, the input gain switching circuit 11 increases the input signal gain of the amplifier circuit 10, and the input filter switching circuit 9 switches the frequency filtering characteristics of the input filter circuit 8 in such a way as to reduce communication errors. In this way, it is possible to minimize communication errors and thereby optimize the communication condition.

FIG. 3 is a flow chart showing the flow of operations performed by the portable data terminal of this embodiment. As shown in FIG. 3, when the user hits a transmission/reception key in STEP 20, operations for transmission and reception are started in STEP 21. After the start of the operations, if an error occurs in transmission or reception, the error is detected and thereby whether the portable data terminal has established communication or has encountered an error is checked in STEP 22. This checking is performed by a program created in advance.

If, in STEP 22 above, no communication error is detected and communication is found to have been established, communication is performed following a predetermined sequence of steps until it comes to a normal end in STEP 23. If, in STEP 22 above, a communication error occurs, the error number counter 16, whose count value is initially set, for example, at 0, increments it count value by one in STEP 24. Then, as will be described later, in STEP 28, whether the number of communication errors counted thus far coincides with a predetermined filter number or not is checked. If no coincidence is observed, then, in STEP 25, whether the number of errors counted thus far in STEP 24 is equal to an odd number or an even number is checked.

If, in STEP 25, the number of communication errors counted thus far is found to be equal to an odd number, then, in STEP 26, the CPU 17 controls the output gain switching circuit 14 so as to increase the gain of the amplifier circuit 13, and thereby increases the output sound pressure level of the acoustic output section 1 by one step so as to reduce communication errors. Then, back in STEP 21, transmission and reception are retried automatically. If a communication error occurs again, this error is detected in STEP 22, and then, in STEP 24, the error number counter 16 increments its count value by one again. Thereafter, the same operations as described above are repeated.

If the number of communication errors counted thus far in STEP 24 above is found to be equal to an even number, then, in STEP 27, the CPU 17 controls the input gain switching circuit 11 so as to increase the gain of the amplifier circuit 10 by one step so as to reduce communication errors in reception. Then, back in STEP 21, transmission and reception are retried automatically. These operations are repeated until the input gain of the acoustic input section 2 and the output sound pressure level become sufficiently high to allow establishment of communication.

Moreover, in STEP 28, whether the number of communication errors counted thus far in STEP 24 coincides with a predetermined filter number or not is checked to determine whether to perform filter adjustment or not. If, in STEP 28, filter adjustment is found to be necessary, a control signal that requests filter adjustment is generated. By this control signal, in STEP 29, the input filter switching circuit 9, which is designed to allow switching of the frequency filtering characteristics among a plurality of patterns, is controlled so as to adjust the filtering characteristics of the input filter circuit 8.

By switching the filtering characteristics of the input filter circuit 8 from one pattern to another in the event of a communication error, it is possible to select automatically an input filter circuit that offers the optimum frequency filtering characteristics in a given communication environment. Here, to achieve as effective noise elimination as possible, the input filter circuits available are each assigned a specific number, and the program is so organized that, when the number of errors counted thus far by the error number counter coincides with the number of a particular input filter circuit, that input filter circuit is selected. This makes it possible to switch effectively among the input filter circuits and thereby keep quality of communication higher than a certain level.

It is to be understood that the program shown in the flow chart described above may be recorded on a data recording medium such as a CD-ROM, floppy disk, or IC card that is separable from the body of the portable data terminal so that the program will be installed in the body by the use of a program reading means (not shown) before it starts being used actually.

Obviously, many modifications and variations of the present invention are possible in light of the above teachings. It is therefore to be understood that within the scope of the appended claims, the invention may be practiced other than as specifically described.

What is claimed is:

1. An acoustic communication terminal apparatus comprising:

a transmitter for transmitting an acoustic signal;

a receiver for receiving an acoustic signal;

an error number counter for counting a number of errors occurring during communication; and a communication quality controller for improving quality of communication by controlling operation of the transmitter and the receiver according to the number of errors counted by the error number counter.

2. An acoustic communication terminal apparatus as claimed in claim 1, wherein the transmitter amplifies an electric signal, and, from the electric signal thus amplified, produces the acoustic signal that is to be transmitted, wherein the receiver produces an electric signal from the acoustic signal received, and amplifies the electric signal thus produced, and wherein the communication quality controller varies gains of the transmitter and the receiver according to the number of errors counted by the error number counter.

3. An acoustic communication terminal apparatus as claimed in claim 2, wherein, every time the number of errors counted by the error number counter becomes equal to an odd number, the communication quality controller varies the gain of one of the transmitter and the receiver, and, every time the number of errors counted by the error number counter becomes equal to an even number, the communication quality controller varies the gain of the other of the transmitter and the receiver.

4. An acoustic communication terminal apparatus as claimed in claim 1, wherein the receiver produces an electric signal from the acoustic signal received, and performs filtering on the electric signal thus produced, and wherein the communication quality controller varies characteristics of the filtering performed by the receiver according to the number of errors counted by the error number counter.

5. An acoustic communication terminal apparatus as claimed in claim 4, wherein the communication quality controller varies the characteristics of the filtering performed by the receiver every time the number of errors counted by the error number counter increases by a predetermined number.

6. A recording medium having a program stored thereon that is to be run on an acoustic communication terminal apparatus that achieves communication by acoustic coupling, the program comprising:

a transmission step of transmitting an acoustic signal;

a reception step of receiving an acoustic signal; and a step of improving quality of communication by counting a number of errors occurring during communication and by varying operation performed in said transmission and reception steps according to the number of errors counted.

7. An acoustic communication terminal apparatus comprising:

a transmitter/receiver section for transmitting an acoustic signal and for receiving an acoustic signal; and a computer based controller having an error number counter for counting a number of transmission and reception errors encountered by said transmitter/receiver section, wherein said transmitter/receiver section comprises a means for controlling transmission and reception according to the number of errors counted by said error number counter.

8. The acoustic communication terminal apparatus as claimed in claim 7, wherein said means for controlling comprises an output gain switching circuit and an input gain switching circuit.

9. The acoustic communication terminal apparatus as claimed in claim 8, wherein said output gain switching circuit and said input gain switching circuit alternately control the gain of the transmission and reception, respectively, based on whether the number of errors counted is an odd or an even number.

10. The acoustic communication terminal apparatus as claimed in claim 7, wherein said means for controlling comprises an input filter circuit for filtering reception in the transmitter/receiver section and an input filter switching circuit for adjusting characteristics of the input filter circuit, based on whether the number of errors counted reaches a predetermined number.

11. An acoustic communication terminal apparatus comprising:

a transmitter/receiver section for transmitting and receiving acoustic signals, comprising
an output gain switching circuit,
an input gain switching circuit, and
an input filter switching circuit for filtering received acoustic signals; and a means for controlling the transmitter/receiver section having an error number counter for counting a number of communications errors in the transmitted and received acoustic signals, wherein gain of both the transmitting and receiving of the transmitter/receiver section is adjusted using the output gain switching circuit and the input gain switching circuit, respectively, based on the number of errors counted, and wherein said filtering of received acoustic signals is adjusted using the input filter switching circuit based on the number of errors counted.

12. A method for improving quality of communication using an acoustic communication terminal having a transmitter/receiver section comprising:

transmitting an acoustic signal;

receiving an acoustic signal;

counting a number of errors occurring during the transmitting and receiving;

when the number of errors equals a predetermined number, adjusting filter characteristics of the transmitter/receiver section; and adjusting gain of transmitting and receiving of the transmitter/receiver section based on the number of errors.

* * * * *